(12) United States Patent
Araki (10) Patent No.: US 8,903,583 B2
(45) Date of Patent: Dec. 2, 2014

(54) VEHICLE, CONTROL METHOD, AND COMPUTER PROGRAM

(75) Inventor: Tomohiko Araki, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 22 days.

(21) Appl. No.: 13/813,125

(22) PCT Filed: Oct. 20, 2011

(86) PCT No.: PCT/JP2011/074154
§ 371 (c)(1),
(2), (4) Date: Jan. 29, 2013

(87) PCT Pub. No.: WO2012/053590
PCT Pub. Date: Apr. 26, 2012

(65) Prior Publication Data
US 2013/0131903 A1    May 23, 2013

(30) Foreign Application Priority Data
Oct. 22, 2010    (JP) ................................. 2010-237801

(51) Int. Cl.
*B60L 9/00*      (2006.01)
*B60L 1/00*      (2006.01)
(Continued)

(52) U.S. Cl.
CPC ............... *B60W 20/40* (2013.01); *B60L 11/14* (2013.01); *B60L 15/20* (2013.01); *B60W 10/02* (2013.01); *B60W 10/06* (2013.01);
(Continued)

(58) Field of Classification Search
CPC ..... B60W 20/00; B60W 10/08; B60W 10/02; B60W 2510/0233; Y10S 903/912; Y10S 903/913; Y10S 903/914; Y10S 903/945; B60K 6/00; B60K 17/356; B60K 23/08; B60K 23/0808

USPC ................. 701/22, 51, 54, 67, 36, 68, 53, 55; 315/131; 477/107, 71, 2, 5, 6, 8; 904/916, 946, 912, 919; 180/65.265, 180/65.21, 65.28, 65.281
See application file for complete search history.

(56) References Cited

U.S. PATENT DOCUMENTS 7,356,398 B2 *   4/2008   Steinmetz et al. .............. 701/55
8,010,264 B2 *   8/2011   Ogata et al. ..................... 701/55
(Continued)

FOREIGN PATENT DOCUMENTS

DE    102007050774 A1    4/2009
DE    102009000706 A1    8/2010
(Continued)

OTHER PUBLICATIONS

The International Search Report of the corresponding International Application, PCT/JP2011/074154 dated Dec. 13, 2011.
(Continued)

*Primary Examiner* — Calvin Cheung
*Assistant Examiner* — Luis A Martinez Borrero
(74) *Attorney, Agent, or Firm* — Cowan, Liebowitz & Latman, P.C.; Mark Montague (57) ABSTRACT

The occurrence of shock and the occurrence of the feeling of losing speed can be prevented. When the clutch is engaged from the state in which the clutch is disengaged and a vehicle is being driven by only the power of an electric motor, an electric motor control unit controls the electric motor so that the torque of the electric motor is decreased at a rate determined according to the torque requested by the driver. During the period in which the torque of the electric motor is decreased at the above rate, a clutch control unit controls the engagement of the clutch so that the clutch is engaged after being set to a half-engaged clutch state in which part of the power is transmitted. The present invention is applicable to hybrid vehicles.

8 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/00* (2006.01)
*B60L 11/14* (2006.01)
*B60L 15/20* (2006.01)
*B60W 10/02* (2006.01)
*B60W 10/06* (2006.01)
*B60W 10/08* (2006.01)
*B60W 30/20* (2006.01)
*B60K 6/48* (2007.10)

(52) U.S. Cl.
CPC .............. *B60W 10/08* (2013.01); *B60W 20/00* (2013.01); *B60W 30/20* (2013.01); *B60K 6/48* (2013.01); *B60L 2210/30* (2013.01); *B60L 2210/40* (2013.01); *B60L 2220/14* (2013.01); *B60L 2240/421* (2013.01); *B60L 2240/423* (2013.01); *B60L 2240/441* (2013.01); *B60L 2240/507* (2013.01); *B60L 2270/145* (2013.01); *B60W 2710/023* (2013.01); *B60W 2710/0644* (2013.01); *B60W 2710/081* (2013.01); *B60Y 2200/92* (2013.01); *Y02T 10/6286* (2013.01); *Y02T 10/642* (2013.01); *Y02T 10/7077* (2013.01); *Y02T 10/7241* (2013.01); *Y10S 903/93* (2013.01); *Y10S 903/946* (2013.01); *B60L 2240/12* (2013.01); *Y02T 10/6221* (2013.01); *B60W 2710/083* (2013.01); *B60W 2710/085* (2013.01)
USPC .................. 701/22; 701/67; 701/51; 701/68; 701/87; 192/3.51; 192/3.52; 192/30; 192/31; 903/930; 903/946

(56) References Cited

U.S. PATENT DOCUMENTS

| | | | |
|---|---|---|---|
| 2004/0014559 A1* | 1/2004 | Bulgrien | 477/71 |
| 2004/0044458 A1* | 3/2004 | Kadota | 701/55 |
| 2004/0168875 A1* | 9/2004 | Dolan | 192/35 |
| 2005/0014605 A1* | 1/2005 | Ries-Mueller | 477/71 |
| 2005/0080540 A1* | 4/2005 | Steinmetz et al. | 701/55 |
| 2006/0089235 A1* | 4/2006 | Kobayashi | 477/107 |
| 2007/0216312 A1* | 9/2007 | Ogata et al. | 315/131 |
| 2008/0071437 A1* | 3/2008 | Hirata et al. | 701/22 |
| 2009/0171522 A1* | 7/2009 | Luo et al. | 701/22 |
| 2009/0171523 A1* | 7/2009 | Luo et al. | 701/22 |
| 2009/0177345 A1* | 7/2009 | Severinsky et al. | 701/22 |
| 2009/0312144 A1 | 12/2009 | Allgaier et al. | |
| 2010/0228412 A1* | 9/2010 | Sah | 701/22 |
| 2010/0286858 A1* | 11/2010 | Otokawa | 701/22 |
| 2010/0305791 A1* | 12/2010 | Sah et al. | 701/22 |
| 2011/0004363 A1* | 1/2011 | Severinsky et al. | 701/22 |
| 2011/0287889 A1 | 11/2011 | Eisele et al. | |

FOREIGN PATENT DOCUMENTS

| | | |
|---|---|---|
| JP | 2000-219062 A | 8/2000 |
| JP | 2006-129576 A | 5/2006 |

OTHER PUBLICATIONS

An European search report to an EP counterpart Application No. 11834429.0-1752 / 2631132 PCT/JP2011074154, dated May 28, 2014.

* cited by examiner

VEHICLE, CONTROL METHOD, AND COMPUTER PROGRAM

CROSS REFERENCE TO RELATED APPLICATIONS

This is a U.S. national stage of application No. PCT/JP2011/074154, filed on Oct. 20, 2011. Priority under 35 U.S.C. §119(a) and 35 U.S.C. §365(b) is claimed from Japanese Patent Application No. 2010-237801 filed on Oct. 22, 2010, the disclosure of which is also incorporated herein by reference.

TECHNICAL FIELD

The present invention relates to a vehicle, a control method, and a computer program.

BACKGROUND ART

A so-called hybrid vehicle that is driven by an internal combustion engine and an electric motor receives attention. When the hybrid vehicle decelerates, the electric motor functions as an electric generator to perform an electric power regeneration (hereinafter, also simply referred to as a regeneration) and storage the electric power. The stored electric power is used for generating driving force, for example, when the vehicle accelerates or runs.

Some hybrid vehicles have a gear box configured to automatically shift gears. Hereinafter, the gear box is also referred to as a transmission.

In this case, a clutch configured to connect the power or cut the connection of the power can be provided between the internal combustion engine and the electric motor.

Figure 5A:
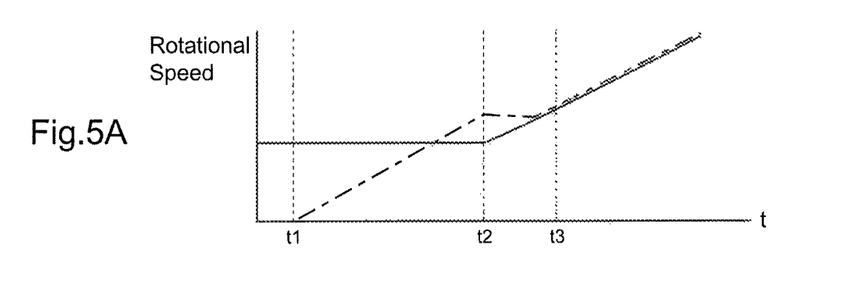
FIG. 5A A time chart when the EV driving state is shifted to the engine driving state in the past.
Figure 5B:
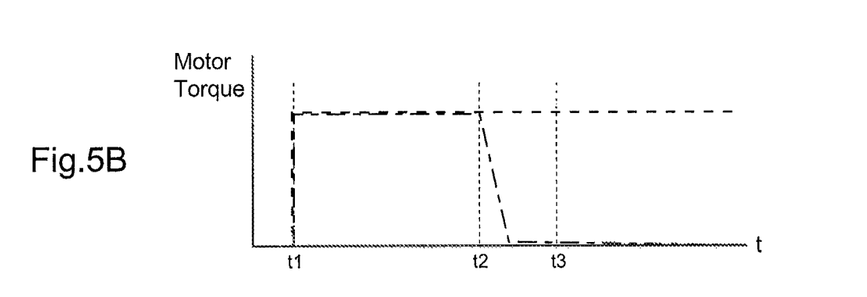
FIG. 5B A time chart when the EV driving state is shifted to the engine driving state in the past.

FIGS. 5A and 5B are time charts for showing the rotational speeds of the electric motor and the internal combustion engine, and the torque of the electric motor and the torque that the driver requests to be generated (hereinafter, referred to as a driver's request torque) when the vehicle shifts from the state in which the vehicle runs only by the driving force of the electric motor (hereinafter, referred to as an EV driving state) to the state in which the vehicle runs only by the driving force of the internal combustion engine (hereinafter, referred to as an engine driving state).

In FIG. 5A, the rotational speed is shown on the vertical axis, and the time is shown on the horizontal axis. In FIG. 5A, the solid line denotes the rotational speed of the internal combustion engine, and the alternate long and short dash line denotes the rotational speed of the electric motor.

In FIG. 5B, the torque is shown on the vertical axis, and the time is shown on the horizontal axis. In FIG. 5B, the dash line denotes the driver's request torque, and the alternate long and short dash line denotes the torque of the electric motor.

The vehicle is started only by the driving force (torque) of the electric motor at a time t1, the shift from the EV driving state to the engine driving state is started at a time t2, and the clutch is engaged so that the state is shifted to the engine driving state during the time from the time t2 to a time t3.

Because the torque of the electric motor is rapidly dropped to zero and the clutch is engaged at the time t2, a period during which the rotational speed of the electric motor does not increase develops from the time t2 to the time t3 as illustrated in FIG. 5A when the rotational speed of the internal combustion engine is lower than the rotational speed of the electric motor.

Some parallel hybrid vehicles in the past include a battery temperature sensor for detecting the state of the battery, an HVECU, a vehicle speed sensor for detecting the state of the vehicle, an engine rotational speed sensor, an accelerator pedal opening sensor, and an FI/AT/MGECU for changing the request values of the engine and the motor based on the accelerator pedal opening and determining from the state of the vehicle whether the supply of fuel to the engine should be stopped. When the vehicle is decelerating and the accelerator pedal opening is equal to or less than a predetermined opening, the fuel cut state is maintained and the target torque found based on the accelerator pedal opening is controlled by an MOTECU until the accelerator pedal opening increases to the predetermined opening (for example, see Patent Literature PTL1).

CITATION LIST

Patent Literature

PTL1: JP 2005-291206 A

SUMMARY OF INVENTION

Technical Problem

However, as described with reference to FIGS. 5A and 5B, when the EV driving state is shifted to the engine driving state, the rotational speeds of the electric motor and the internal combustion engine are synchronized with each other in order to engage (connect) the clutch and it is necessary to cut the torque of the electric motor in order to reduce the shock occurring when the clutch is engaged (connected). Although this reduces the shock, cutting the torque of the electric motor causes the feeling of losing speed.

In light of the foregoing, an objective of the present invention is to solve the above-mentioned problem, in other word, to provide a vehicle, a control method, and a computer program that are capable of preventing the occurrence of shock and the occurrence of the feeling of losing speed.

Solution to Problem

To solve the above-mentioned problem, an aspect of the vehicle of the present invention is a vehicle driven by an internal combustion engine and an electric motor that are connected to each other through a clutch configured to connect or cut power, and the vehicle includes an apparatus including electric motor control means for controlling the electric motor in order to reduce a torque of the electric motor at a rate determined according to a torque requested by a driver when the clutch is engaged from a state in which the clutch is disengaged and the vehicle is driven only by the power of the electric motor, and clutch engagement control means for controlling the engagement of the clutch in order to shift the clutch to a half-engaged clutch state where the power is partially transmitted and then engage the clutch during the period when the torque of the electric motor is reduced at the rate.

Further, an aspect of the vehicle of the present invention, in addition to the above-mentioned structure, further includes request means for requesting a synchronization of a rotational speed of the internal combustion engine when the clutch is engaged from a state in which the clutch is disengaged and the vehicle is driven only by the power of the electric motor.

Further, an aspect of the vehicle of the present invention, in addition to the above-mentioned structure, further includes determining means for determining whether a difference between a rotational speed of the electric motor and the rotational speed of the internal combustion engine is less than a predetermined threshold, wherein the clutch engagement control means controls the engagement of the clutch in order to shift the clutch to a half-engaged clutch state where the power is partially transmitted and then engage the clutch when it is determined that the difference between the rotational speed of the electric motor and the rotational speed of the internal combustion engine is less than the predetermined threshold.

Further, an aspect of the control method of the present invention is a control method of a vehicle driven by an internal combustion engine and an electric motor that are connected to each other through a clutch configured to connect or cut power, and the control method includes an electric motor control step for controlling the electric motor in order to reduce a torque of the electric motor at a rate determined according to a torque requested by a driver when the clutch is engaged from a state in which the clutch is disengaged and the vehicle is driven only by the power of the electric motor, and a clutch engagement control step for controlling the engagement of the clutch in order to shift the clutch to a half-engaged clutch state where the power is partially transmitted and then engage the clutch during the period when the torque of the electric motor is reduced at the rate.

Further, an aspect of the computer program of the present invention causes a computer for controlling a vehicle driven by an internal combustion engine and an electric motor that are connected to each other through a clutch configured to connect or cut power to perform a process including an electric motor control step for controlling the electric motor in order to reduce a torque of the electric motor at a rate determined according to a torque requested by a driver when the clutch is engaged from a state in which the clutch is disengaged and the vehicle is driven only by the power of the electric motor, and a clutch engagement control step for controlling the engagement of the clutch in order to shift the clutch to a half-engaged clutch state where the power is partially transmitted and then engage the clutch during the period when the torque of the electric motor is reduced at the rate.

Advantageous Effect of Invention

To solve the above-mentioned problem, an aspect of the vehicle of the present invention is a vehicle driven by an internal combustion engine and an electric motor that are connected to each other through a clutch configured to connect or cut power, and the vehicle includes an apparatus including electric motor control means for controlling the electric motor in order to reduce a torque of the electric motor at a rate determined according to a torque requested by a driver when the clutch is engaged from a state in which the clutch is disengaged and the vehicle is driven only by the power of the electric motor, and clutch engagement control means for controlling the engagement of the clutch in order to shift the clutch to a half-engaged clutch state where the power is partially transmitted and then engage the clutch during the period when the torque of the electric motor is reduced at the rate.

Further, an aspect of the vehicle of the present invention, in addition to the above-mentioned structure, further includes request means for requesting a synchronization of a rotational speed of the internal combustion engine when the clutch is engaged from a state in which the clutch is disengaged and the vehicle is driven only by the power of the electric motor.

Further, an aspect of the vehicle of the present invention, in addition to the above-mentioned structure, further includes determining means for determining whether a difference between a rotational speed of the electric motor and the rotational speed of the internal combustion engine is less than a predetermined threshold, wherein the clutch engagement control means controls the engagement of the clutch in order to shift the clutch to a half-engaged clutch state where the power is partially transmitted and then engage the clutch when it is determined that the difference between the rotational speed of the electric motor and the rotational speed of the internal combustion engine is less than the predetermined threshold.

Further, an aspect of the control method of the present invention is a control method of a vehicle driven by an internal combustion engine and an electric motor that are connected to each other through a clutch configured to connect or cut power, and the control method includes an electric motor control step for controlling the electric motor in order to reduce a torque of the electric motor at a rate determined according to a torque requested by a driver when the clutch is engaged from a state in which the clutch is disengaged and the vehicle is driven only by the power of the electric motor, and a clutch engagement control step for controlling the engagement of the clutch in order to shift the clutch to a half-engaged clutch state where the power is partially transmitted and then engage the clutch during the period when the torque of the electric motor is reduced at the rate.

Further, an aspect of the computer program of the present invention causes a computer for controlling a vehicle driven by an internal combustion engine and an electric motor that are connected to each other through a clutch configured to connect or cut power to perform a process including an electric motor control step for controlling the electric motor in order to reduce a torque of the electric motor at a rate determined according to a torque requested by a driver when the clutch is engaged from a state in which the clutch is disengaged and the vehicle is driven only by the power of the electric motor, and a clutch engagement control step for controlling the engagement of the clutch in order to shift the clutch to a half-engaged clutch state where the power is partially transmitted and then engage the clutch during the period when the torque of the electric motor is reduced at the rate.

DESCRIPTION OF EMBODIMENTS

Hereinafter, a hybrid vehicle according to an embodiment of the present invention will be described with reference to FIGS. 1 to 4.

Figure 1:
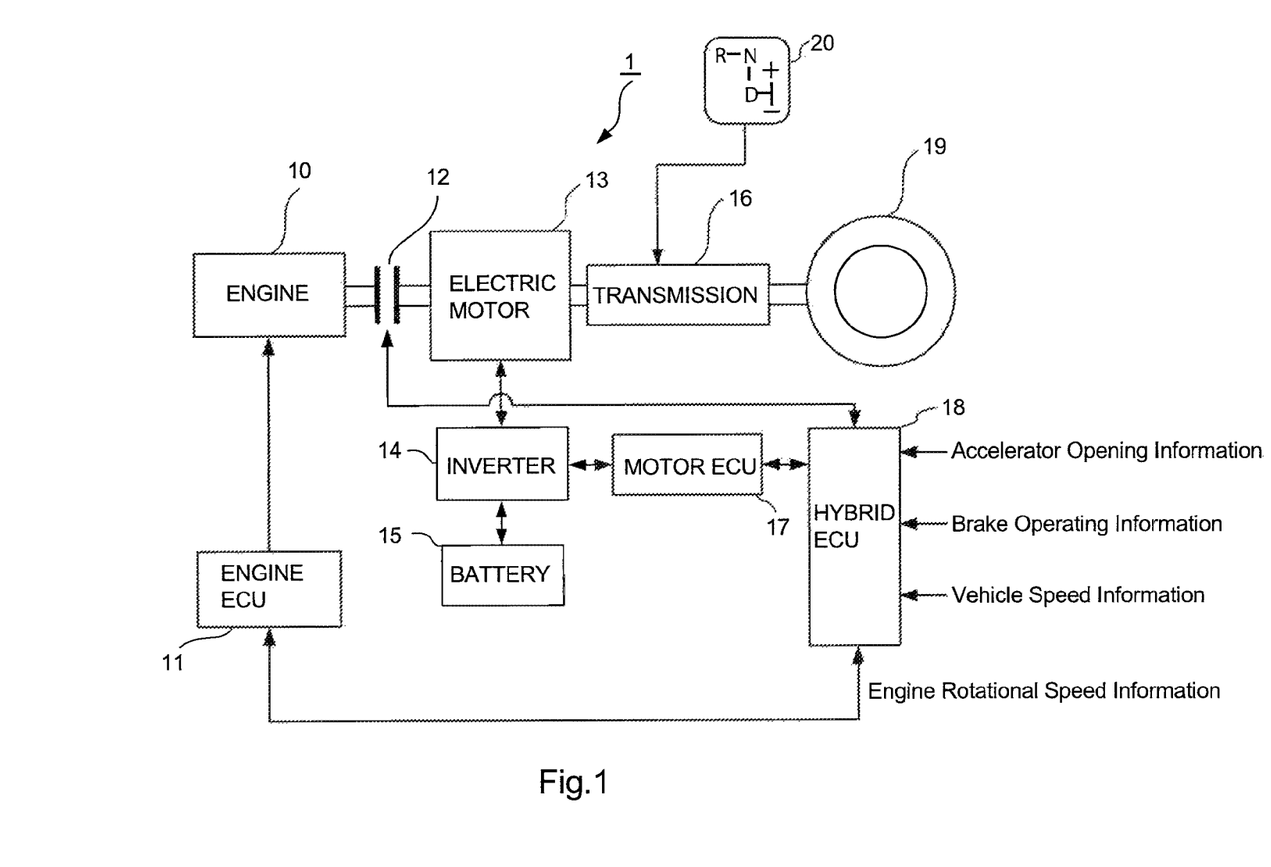
FIG. 1 A block diagram for illustrating an exemplary structure of a hybrid vehicle 1.

FIG. 1 is a block diagram for illustrating an exemplary structure of a hybrid vehicle 1. The hybrid vehicle 1 is an example of a vehicle. The hybrid vehicle 1 is driven by an internal combustion engine and/or an electric motor through a gear box configured to automatically shift gears. For example, when the vehicle decelerates, the electric power can be regenerated by the electric motor. The gear box configured to automatically shift the gears is, for example, referred to as a semiautomatic transmission. The transmission can automatically shift the gears while having the same structure as a manual transmission.

The hybrid vehicle 1 includes an engine 10, an engine Electronic Control Unit (ECU) 11, a clutch 12, an electric motor 13, an inverter 14, a battery 15, a transmission 16, a motor ECU 17, a hybrid ECU 18, a wheel 19, and a shift unit 20. Note that the transmission 16 includes the above-mentioned semiautomatic transmission and is operated by the shift unit 20 including a drive range (hereinafter, referred to as a D (Drive) range).

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the motor ECU 17 corresponding to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (micro-computer), a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects (hereinafter, simply referred to as connects) the rotating shaft of the engine 10 to the rotating shaft of the electric motor 13 by the control of the hybrid ECU 18 in order to transmit the shaft output of the engine 10 to the electric motor 13. On the other hand, the clutch 12 cuts (hereinafter, simply referred to as cuts or disconnects) the mechanical connection between the rotating shaft of the engine 10 and the rotating shaft of the electric motor 13 so that the rotating shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Alternatively, for example, the clutch 12 cuts the mechanical connection between the rotating shaft of the engine 10 and the rotating shaft of the electric motor 13 when the engine 10 stops or is in an idling state and the hybrid vehicle 1 runs by the driving force of the electric motor 13, and when the hybrid vehicle 1 decelerates or runs on the down grade and the electric motor 13 generates electric power (regenerates electric power) while the engine 10 stops or is in an idling state.

Note that the clutch 12 differs from the clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 accelerates or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 runs without power, for example, the hybrid vehicle 1 decelerates or runs on the down grade. In that case, electric power is generated by the power for rotating the shaft supplied from the transmission 16 and is supplied to the inverter 14 in order to charge the battery 15.

The inverter 14 is controlled by the motor ECU 17, and converts the direct voltage from the battery 15 into an alternating voltage or converts the alternating voltage from the electric motor 13 into a direct voltage. When the electric motor 13 generates power, the inverter 14 converts the direct voltage of the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power.

The transmission 16 includes a semiautomatic transmission (not shown in the drawings) that selects one of a plurality of gear ratios (change gear ratios) according to the signal to instruct to shift gears from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle decelerates or runs on the down grade. By the operation of the shift unit 20 in which the drive range (D range), a neutral range, a reverse range, or the like is selected by the driver, the transmission 16 is shifted to a driving state in which the power is transmitted with shifting gears, a so-called neutral state in which the transmission of the power is interrupted, or a reverse state. Note that the semiautomatic transmission can also shift the gear position to a given gear number by the driver's hand operation of the shift unit 20.

The motor ECU 17 is a computer working in coordination with the engine ECU 11 corresponding to the instructions from the hybrid ECU 18, and controls the electric motor 13 by controlling the inverter 14. For example, the motor ECU 17 includes a CPU, an ASIC, a microprocessor (micro-computer), a DSP, and the like, and internally has an operation unit, a memory, an I/O port, and the like.

The hybrid ECU 18 is an example of a computer. The hybrid ECU 18 obtains accelerator opening information, brake operation information, vehicle speed information, and the like and controls the clutch 12 by referring to the information. The hybrid ECU 18 further gives the control instructions of the electric motor 13 and the inverter 14 to the motor ECU 17, and gives the control instruction of the engine 10 to the engine ECU 11. For example, the hybrid ECU 18 includes a CPU, an ASIC, a microprocessor (micro-computer), a DSP, and the like, and internally has an operation unit, a memory, an I/O port, and the like.

Note that a computer program to be executed by the hybrid ECU 18 can be previously installed on the hybrid ECU 18 that is a computer by being stored in a non-volatile memory inside the hybrid ECU 18 in advance.

The engine ECU 11, the motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only one wheel 19 is illustrated in FIG. 1, the hybrid vehicle 1 actually includes a plurality of the wheels 19.

Figure 2:
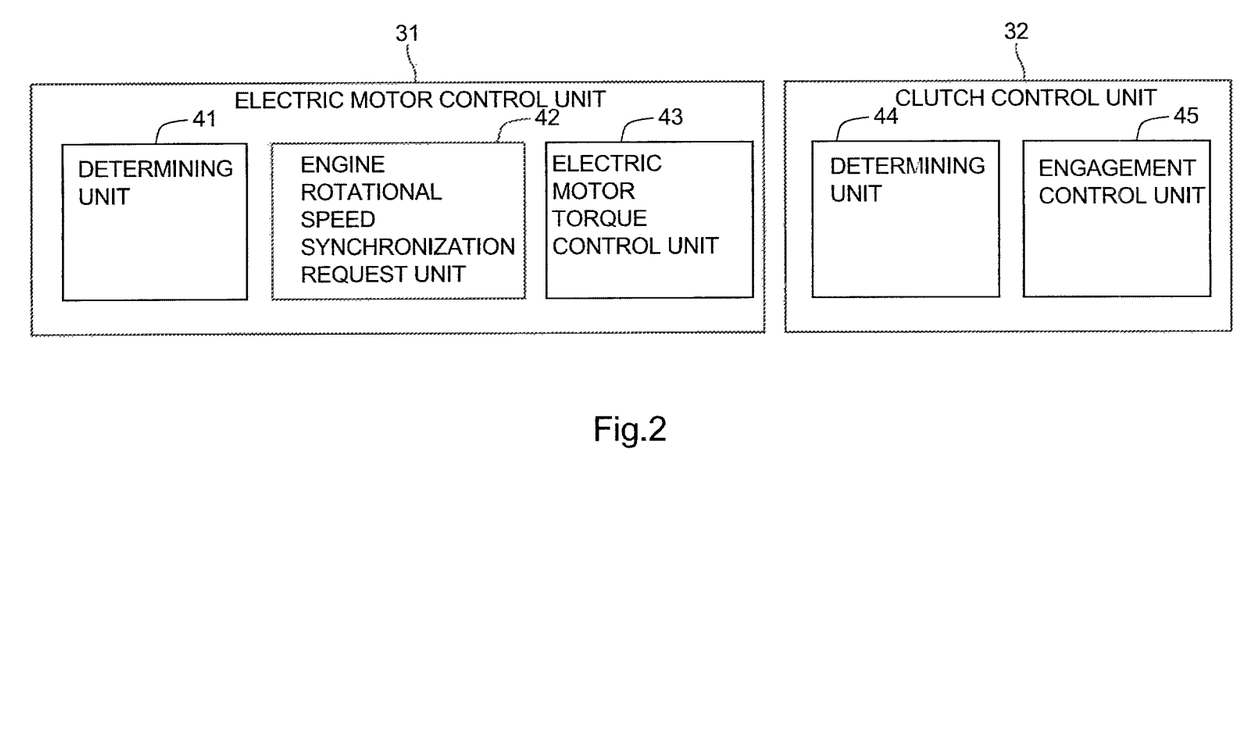
FIG. 2 A block diagram for illustrating an exemplary configuration of a function implemented in an ECU 18.

FIG. 2 is a block diagram for illustrating an exemplary configuration of a function implemented in the hybrid ECU 18 that executes a computer program. In other words, once the hybrid ECU 18 executes a computer program, an electric motor control unit 31 and a clutch control unit 32 are implemented.

The electric motor control unit 31 gives the control instructions of the electric motor 13 and the inverter 14 to the motor ECU 17 and controls the electric motor 13 in order to rotate the electric motor 13 at a desired rotational speed and generate a desired torque at the electric motor 13.

The clutch control unit 32 controls the clutch 12 by transmitting a control signal.

In more detail, the electric motor control unit 31 includes a determining unit 41, an engine rotational speed synchronization request unit 42, and an electric motor torque control unit 43. The determining unit 41 variously determines, for example, whether the rotational speed of the electric motor 13 has exceeded the rotational speed in which the EV driving state is terminated.

The engine rotational speed synchronization request unit 42 gives the control instruction of the engine 10 to the engine ECU 11, and requests the synchronization of the rotational speed of the engine 10 with the rotational speed of the electric motor 13. The electric motor torque control unit 43 gives the control instructions of the electric motor 13 and the inverter 14 to the motor ECU 17 and controls the electric motor 13 in order to generate a desired torque at the electric motor 13.

The clutch control unit 32 includes a determining unit 44 and an engagement control unit 45. The determining unit 44 determines whether the absolute value of the difference between the rotational speed of the electric motor 13 and the rotational speed of the engine 10 has been less than the rotational speed in which the clutch is engaged and which is a predetermined threshold. The engagement control unit 45 transmits the control signal in order to disengage the clutch 12 or partially transmit the power or, namely, shift the clutch to a half-engaged clutch state. Alternatively, the engagement control unit 45 controls the clutch 12 so that the clutch 12 is disengaged.

FIGS. 3A to 3D are time charts for illustrating the rotational speeds of the electric motor 13 and the engine 10, the state of the clutch 12, the generated torque of the engine 10, the generated torque of the electric motor 13, and the driver's request torque when the EV driving state is shifted to the engine driving state.

Figure 3A:
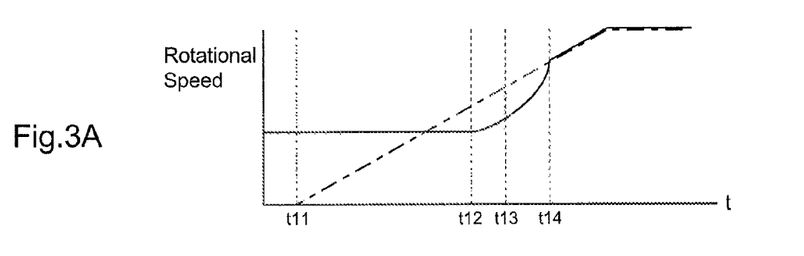
FIG. 3A A time chart when the EV driving state is shifted to the engine driving state.
Figure 3B:
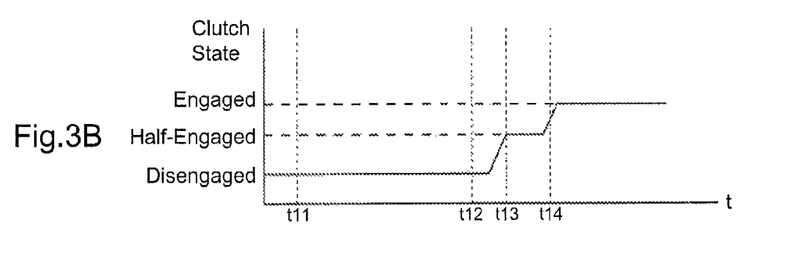
FIG. 3B A time chart when the EV driving state is shifted to the engine driving state.
Figure 3C:
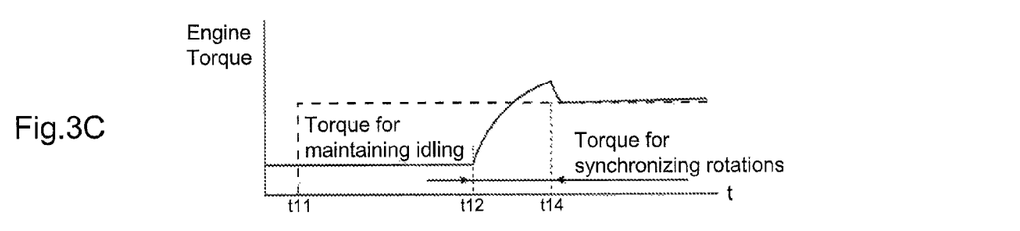
FIG. 3C A time chart when the EV driving state is shifted to the engine driving state.

In FIG. 3A, the rotational speed is shown on the vertical axis, and the time is shown on the horizontal axis. In FIG. 3A, the solid line denotes the rotational speed of the engine 10, and the alternate long and short dash line denotes the rotational speed of the electric motor 13. In FIG. 3B, the state of the clutch 12 is shown on the vertical axis, and the time is shown on the horizontal axis. In FIG. 3C, the torque of the engine 10 is shown on the vertical axis, and the time is shown on the horizontal axis. In FIG. 3C, the dash line denotes the driver's request torque, and the solid line denotes the torque of the engine 10.

Figure 3D:
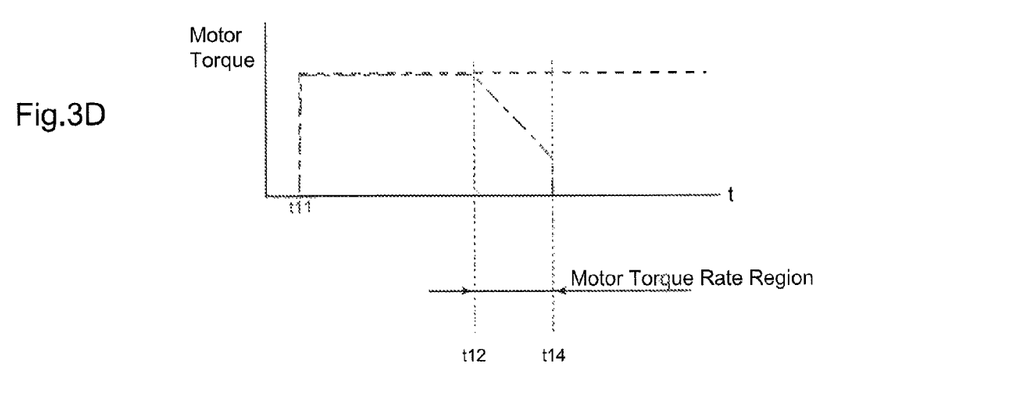
FIG. 3D A time chart when the EV driving state is shifted to the engine driving state.

In FIG. 3D, the torque of the electric motor 13 is shown on the vertical axis, and the time is shown on the horizontal axis. In FIG. 3D, the dash line denotes the driver's request torque, and the alternate long and short dash line denotes the torque of the electric motor 13.

The vehicle starts only by the driving force (torque) of the electric motor 13 in the EV driving state at a time t11, the shift from the EV driving state to the engine driving state is started at a time t12, the clutch 12 is shifted to the half-engaged clutch state at a time t13, and the clutch 12 is engaged and the vehicle is shifted to the engine driving state at a time t14.

Because the vehicle starts by the driving force (torque) of the electric motor 13 in the EV driving state at a time t11, the rotational speed of the electric motor 13 is increased at the period from the time t11 to the time t12 as illustrated in FIG. 3A whereas the rotational speed of the engine 10 is maintained at the rotational speed of idling. The clutch 12 is disengaged at the period from the time t11 to the time t12 as illustrated in FIG. 3B. The engine 10 generates torque for maintaining idling as illustrated in FIG. 3C. Further, at the period from the time t11 to the time t12, the electric motor 13 generates torque that is equal to the driver's request torque as illustrated in FIG. 3D.

Because the rotational speed of the electric motor 13 has exceeded an EV-driving-state terminating rotational speed that is a threshold indicating the rotational speed in which the EV driving state is terminated at the time t12, the shift from the EV driving state to the engine driving state is started.

The rotational speed of the engine 10 starts to increase from the time t12 as illustrated in FIG. 3A. The torque generated by the engine 10 also starts to increase as illustrated in FIG. 3C. Further, from the time t12, the torque of the electric motor 13 is decreased at a predetermined rate a (Nm/sec) corresponding to the driver's request torque as illustrated in FIG. 3D.

As illustrated in FIG. 3B, the instruction to shift the clutch 12 to the half-engaged clutch state is supplied to shift the clutch 12 just before the time t13, and the clutch 12 comes into the half-engaged clutch state at the time t13. As illustrated in FIG. 3A, the rotational speed of the engine 10 rapidly approaches the rotational speed of the electric motor 13 from the time t13 when the clutch comes into the half-engaged clutch state. Further, as illustrated in FIG. 3C, from the time t13 when the clutch has come into the half-engaged clutch state, the torque generated by the engine 10 is increased in order to rapidly approach the driver's request torque.

As illustrated in FIG. 3B, the instruction to engage the clutch 12 is supplied to the clutch 12 just before a time t14, and the clutch 12 is engaged at the time t14. Because the clutch 12 is engaged, the rotational speed of the engine 10 is equal to the rotational speed of the electric motor 13 at the time t14 as illustrated in FIG. 3A. When becoming smaller than an EV terminating torque that is a predetermined threshold at the time t14, the torque of the electric motor 13 is cut to be zero at the time t14 as illustrated in FIG. 3D. The engine 10 generates torque that is equal to the driver's request torque from the time t14 as illustrated in FIG. 3C.

As described above, the period from the time t12 to the time t14 is assumed as a motor torque rate region. The torque of the electric motor 13 is decreased at the rate a (Nm/sec) according to the driver's request torque. When becoming smaller than the EV terminating torque, the torque of the electric motor 13 becomes zero.

Figure 4:
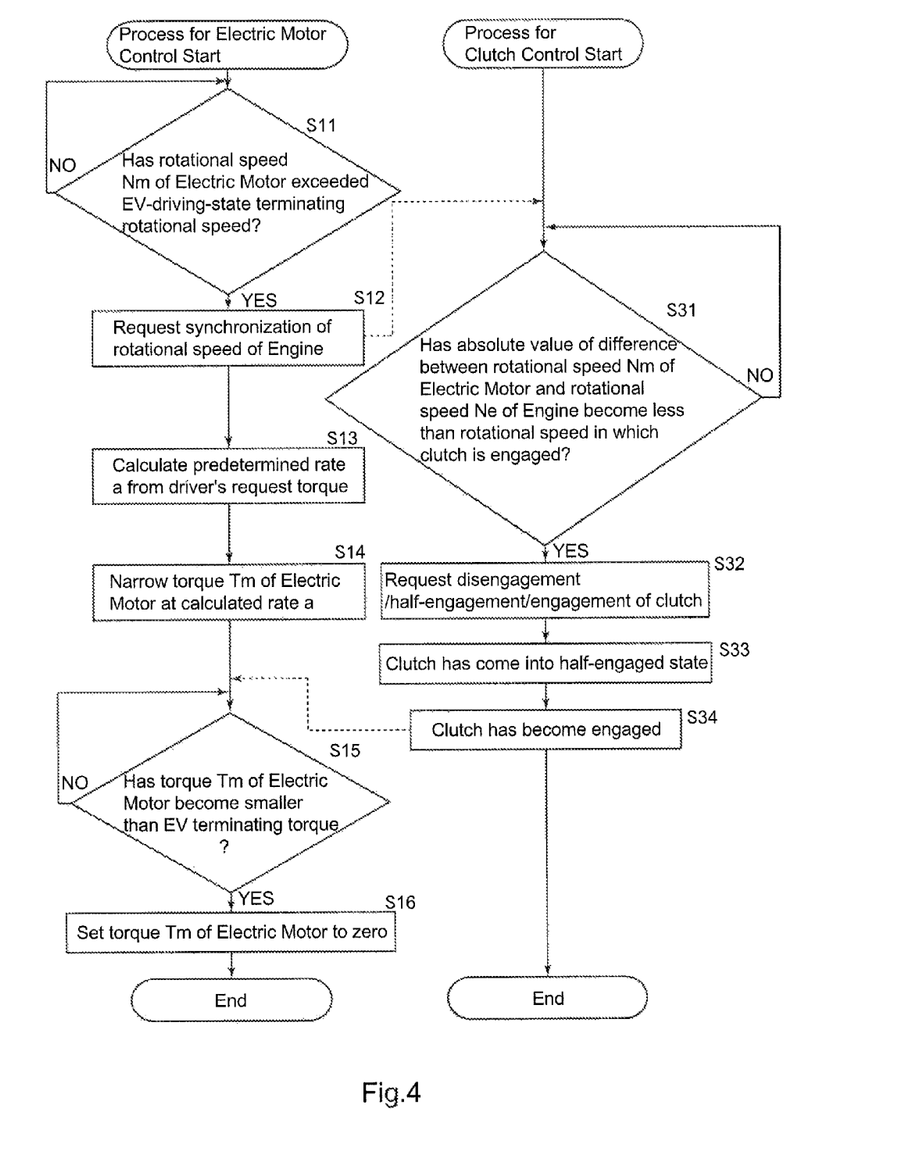
FIG. 4 A flowchart for describing a process for the electric motor control and a process for the clutch control.

FIG. 4 is a flowchart for describing a process for the electric motor control and a process for the clutch control. In step S11 of the process for the electric motor control, the determining unit 41 of the electric motor control unit 31 determines whether a rotational speed Nm of the electric motor 13 has exceeded the EV-driving-state terminating rotational speed by comparing the rotational speed Nm of the electric motor 13 indicated by electric motor rotational speed information obtained by the motor ECU 17 with the EV-driving-state terminating rotational speed that is a threshold indicating the rotational speed in which the EV driving state is terminated.

In step S11 of the process for the electric motor control, when it is determined that the rotational speed Nm of the electric motor 13 has exceeded the EV-driving-state terminating rotational speed, the process for the electric motor control proceeds to step S12. Then, the engine rotational speed synchronization request unit 42 gives the control instruction of the engine 10 to the engine ECU 11, and requests the synchronization of the rotational speed of the engine 10 with the rotational speed of the electric motor 13. The request for the synchronization of the rotational speed of the engine 10 is notified to the process for the clutch control.

In step S13 of the process for the electric motor control, the electric motor torque control unit 43 finds (calculates), from the driver's request torque, the rate a (Nm/sec) indicating the rate at which the torque of the electric motor 13 is reduced relative to the time course. For example, the electric motor torque control unit 43 sets, as the rate a, the quotient obtained by dividing, by the time required to engage the clutch 12, the result of subtracting the EV terminating torque (described below) from the driver's request torque. In step S14 of the process for the electric motor control, the electric motor torque control unit 43 gives the control instructions of the electric motor 13 and the inverter 14 to the motor ECU 17, and controls the electric motor 13 in order to narrow a torque Tm of the electric motor 13 at the found rate a.

On the other hand, when the fact that the synchronization of the rotational speed of the engine 10 has been requested is notified to the process for the clutch control, the determining unit 44 determines in step S31 of the process for the clutch control whether the absolute value of the difference between the rotational speed Nm of the electric motor 13 and a rotational speed Ne of the engine 10 has been less than the rotational speed in which the clutch is engaged and which is a predetermined threshold. The determining unit 44 repeats the determination until the absolute value of the difference between the rotational speed Nm of the electric motor 13 and the rotational speed Ne of the engine 10 becomes less than the rotational speed in which the clutch is engaged.

When it is determined in step S31 that the absolute value of the difference between the rotational speed Nm of the electric motor 13 and the rotational speed Ne of the engine 10 has become less than the rotational speed in which the clutch is engaged, the process for the clutch control proceeds to step S32. Then, the engagement control unit 45 supplies the instruction to the clutch 12, and requests the clutch 12 to come from the disengaged state into the half-engaged clutch state, and into the engaged state. The clutch 12 comes into the half-engaged clutch state in step S33 of the process for the clutch control. Then, the clutch 12 comes into the engaged state in step S34 of the process for the clutch control. When the clutch 12 comes into the engaged state, the fact is notified to the process for the electric motor control.

When the fact that the clutch 12 has come into the engaged state is notified to the process for the electric motor control, the determining unit 41 determines in step S15 of the process for the electric motor control whether the torque Tm generated by the electric motor 13 has become smaller than the EV terminating torque that is a predetermined threshold. The determining unit 41 repeats the determination until the torque Tm becomes smaller than the EV terminating torque.

When it is determined in step S15 that the torque Tm generated by the electric motor 13 has become smaller than the EV terminating torque, the process for the electric motor control proceeds to step S16. Then, the electric motor torque control unit 43 gives the control instructions of the electric motor 13 and the inverter 14 to the motor ECU 17, and controls the electric motor 13 in order to get the torque Tm of the electric motor 13 into zero. Then, the process for the electric motor control is terminated. The process for the clutch control is also terminated with the termination of the process for the electric motor control.

As described above, when it is necessary to engage the clutch 12 from the EV driving state, the engine 10 is required to synchronize the rotation with the rotation of the electric motor 13. At the same time, the torque of the electric motor 13 is narrowed to the torque at which the shock caused by the engagement of the clutch does not occur while the feeling of increasing speed is maintained at the rate a according to the driving torque (the driver's request torque) at that time. While the torque of the electric motor 13 is narrowed, the clutch 12 is engaged in order not to cause the feeling of strangeness at the shift from the torque of electric motor 13 to the torque of the engine 10. With the control, as a method for controlling the torque of the electric motor 13 in order to reduce the shock without causing the feeling of losing speed, a control apparatus configured to determine the torque of the electric motor 13 as a constant using the variation of the acceleration acceptable to the torque in the EV driving state and the torque of electric motor 13 when the clutch 12 is engaged is provided. When the engagement of the clutch 12 occurs, a torque narrowing rate and a clutch engagement acceptable torque are generated using the determined constant.

As described above, the occurrence of shock and the occurrence of the feeling of losing speed can be prevented.

Alternatively, the threshold of the EV terminating torque described in step S15 of the flowchart in FIG. 4 may be changed, for example, according to the gross weight of the hybrid vehicle 1 or the degree of the upgrade of the road surface on which the hybrid vehicle 1 runs. For example, when the gross weight of the hybrid vehicle 1 is relatively heavy, or when the degree of the upgrade of the road surface on which the hybrid vehicle 1 runs is relatively large, the driver requires a relatively large torque. As described above, when the driver requires a relatively large torque, because the driver generally dislikes the feeling of losing speed more than the shock caused by the engagement of the clutch, it is preferable in such a case to give more priority to the reduction of the feeling of losing speed over the reduction of the shock caused by the engagement of the clutch. Thus, the vehicle is controlled in order to reduce the rate of decrease in the motor torque denoted with the alternate long and short dash line in the motor torque rate region at the period from the time t12 to the time t14 illustrated in FIG. 3D (in other word, in order to reduce the inclination of the alternate long and short dash line). Accordingly, the control can be implemented in such manner as when the driver requires a relatively large torque, the reduction of the feeling of losing speed is given priority over the reduction of the shock caused by the engagement of the clutch, and in other case (in other words, when the driver does not require a relatively large torque), both of the reduction of the shock caused by the engagement of the clutch and the feeling of losing speed are reduced.

Note that the gross weight of the hybrid vehicle 1 can be found by measuring the load of the carrier, for example, by the axle sensor provided on the axle. Alternatively, the gross weight of the hybrid vehicle 1 may also be estimated by checking the behavior of the running hybrid vehicle 1 (for example, see JP 2004-025956 A). Further, the inclination of the road surface on which the hybrid vehicle 1 runs can be found, for example, using an inclination sensor or the like. Alternatively, instead of detecting the gross weight of the hybrid vehicle 1 or the inclination of the road surface on which the hybrid vehicle 1 runs, by detecting the amount depressed by the driver of the accelerator pedal using a sensor or the like, the driver's request torque is directly detected. According to the detection result, the threshold of the EV terminating torque may be changed.

Further, although the engine 10 has been described as an internal combustion engine, the engine 10 may also be a heat engine including an external combustion engine.

Further, while the computer program executed by the hybrid ECU 18 is installed on the hybrid ECU 18 in advance in the description above, the computer program may be installed on the hybrid ECU 18 as a computer by attaching removable media recording the computer program (storing the computer program), for example, to a drive (not shown in the drawings) and storing the computer program read from the removable media in a non-volatile memory inside the hybrid ECU 18, or receiving, by a communication unit (not shown in the drawings), a computer program transmitted through a wired or wireless transmission medium and storing the computer program in a non-volatile memory inside the hybrid ECU 18.

Further, each ECU may be implemented by an ECU combining some or all of the functions of the ECUs. Alternatively, an ECU may newly be provided by the further subdivision of the function of each ECU.

Note that the computer program executed by the computer may be for performing the process in chronological order according to the order described herein or may be for performing the process in parallel or at the necessary timing, for example, when the computer program is invoked.

Further, the embodiments of the present invention are not limited to the above-mentioned embodiments, and can be variously modified without departing from the gist of the invention.

The invention claimed is:

1. A vehicle driven by an internal combustion engine and an electric motor that are connected to each other through a clutch configured to connect or cut power, the vehicle comprising an apparatus including:
    electric motor control means for controlling the electric motor that reduces a torque of the electric motor at a rate determined according to a torque requested by a driver when the clutch is engaged from a state in which the clutch is disengaged and while the vehicle is driven only by the power of the electric motor; and
    clutch engagement control means for controlling the engagement of the clutch that shifts the clutch to a half-engaged clutch state where the power is partially transmitted and engages the clutch during the period while the torque of the electric motor is reduced at the rate.

2. The vehicle according to claim 1, further comprising:
    request means for requesting a synchronization of a rotational speed of the internal combustion engine when the clutch is engaged from the state in which the clutch is disengaged and the vehicle is driven only by the power of the electric motor.

3. The vehicle according to claim 1,
    wherein the clutch engagement control means controls the engagement of the clutch to shift the clutch to the half-engaged clutch state where the power is partially transmitted and then engage the clutch if a difference between a rotational speed of the electric motor and the rotational speed of the internal combustion engine is less than a predetermined threshold.

4. A control method of a vehicle driven by an internal combustion engine and an electric motor that are connected to each other through a clutch configured to connect or cut power, the control method comprising:
    an electric motor control step for controlling the electric motor that reduces a torque of the electric motor at a rate determined according to a torque requested by a driver when the clutch is engaged from a state in which the clutch is disengaged and while the vehicle is driven only by the power of the electric motor; and
    a clutch engagement control step for controlling the engagement of the clutch that shifts the clutch to a half-engaged clutch state where the power is partially transmitted and then engages the clutch during the period while the torque of the electric motor is reduced at the rate.

5. A non-transitory computer-readable storage medium for storing a computer program causing a computer to control a vehicle driven by an internal combustion engine and an electric motor that are connected to each other through a clutch configured to connect or cut power to perform a process including:
    an electric motor control step for controlling the electric motor that reduces a torque of the electric motor at a rate determined according to a torque requested by a driver when the clutch is engaged from a state in which the clutch is disengaged and while the vehicle is driven only by the power of the electric motor; and
    a clutch engagement control step for controlling the engagement of the clutch that shifts the clutch to a half-engaged clutch state where the power is partially transmitted and then engages the clutch during the period while the torque of the electric motor is reduced at the rate.

6. A vehicle driven by an internal combustion engine and an electric motor that are connected to each other through a clutch configured to connect or cut power, the vehicle comprising:
    an Electronic Control Unit (ECU) which controls operation of the an internal combustion engine and an electric motor,
    wherein the ECU includes an electric motor control configured to find a torque reducing rate which is determined according to a torque requested by a driver and indicates the rate at which the torque of the electric motor is reduced relative to a time course, and controlling the electric motor that reduces a torque of the electric motor at the torque reducing rate, when the clutch is engaged from a state in which the clutch is disengaged and while the vehicle is driven only by the power of the electric motor; and
    clutch engagement control means of controlling the engagement of the clutch that shifts the clutch to a half-engaged clutch state where the power is partially transmitted during a period while the torque of the electric motor is reduced at the torque reducing rate and then engages the clutch.

7. A control method of a vehicle driven by an internal combustion engine and an electric motor that are connected to each other through a clutch configured to connect or cut power, the vehicle comprising an Electronic Control Unit (ECU) for controlling operation of the internal combustion engine and the electric motor, the control method comprising:
- an electric motor control step performed by the ECU configured to find a torque reducing rate which is determined according to a torque requested by a driver and indicates the rate at which the torque of the electric motor is reduced relative to a time course, and for controlling the electric motor that reduces a torque of the electric motor at the torque reducing rate when the clutch is engaged from a state in which the clutch is disengaged and while the vehicle is driven only by the power of the electric motor; and
- a clutch engagement control step performed by the ECU for controlling the engagement of the clutch that shifts the clutch to a half-engaged clutch state where the power is partially transmitted during a period while the torque of the electric motor is reduced at the torque reducing rate and then engages the clutch.

8. A non-transitory computer-readable storage medium for storing a computer program causing a computer to control a vehicle driven by an internal combustion engine and an electric motor that are connected to each other through a clutch configured to connect or cut power, the vehicle comprising an Electronic Control Unit (ECU) for controlling operation of the internal combustion engine and the electric motor, to perform a process including:
- an electric motor control step performed by the ECU configured to find a torque reducing rate which is determined according to a torque requested by a driver and indicates the rate at which the torque of the electric motor is reduced relative to a time course, and for controlling the electric motor that reduces a torque of the electric motor at the torque reducing rate when the clutch is engaged from a state in which the clutch is disengaged and while the vehicle is driven only by the power of the electric motor; and
- a clutch engagement control step performed by the ECU for controlling the engagement of the clutch that shifts the clutch to a half-engaged clutch state where the power is partially transmitted during a period while the torque of the electric motor is reduced at the torque reducing rate and then engages the clutch.

* * * * *